(12) United States Patent
Ikeda et al.

(10) Patent No.: US 8,345,331 B2
(45) Date of Patent: Jan. 1, 2013

(54) IMAGE READING APPARATUS, MULTIFUNCTION PRINTER APPARATUS, AND IMAGE PROCESSING METHOD

(75) Inventors: Tohru Ikeda, Yokohama (JP); Takashi Nakamura, Yokohama (JP); Fumihiro Goto, Kawasaki (JP); Akitoshi Yamada, Yokohama (JP); Hidetsugu Kagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 12/634,184

(22) Filed: Dec. 9, 2009

(65) Prior Publication Data

US 2010/0157395 A1   Jun. 24, 2010

(30) Foreign Application Priority Data

Dec. 22, 2008   (JP) ................................ 2008-326585

(51) Int. Cl.
*H04N 1/04*   (2006.01)
(52) U.S. Cl. ........ 358/505; 358/1.9; 358/3.26; 358/3.27
(58) Field of Classification Search .................. 358/505, 358/1.9, 3.26–3.27
See application file for complete search history.

(56) References Cited

U.S. PATENT DOCUMENTS

| 4,729,036 | A | 3/1988 | Ikeda et al. | 358/296 |
|---|---|---|---|---|
| 5,708,513 | A | 1/1998 | Hasuo et al. | 358/450 |
| 6,456,748 | B1 * | 9/2002 | Yushiya et al. | 382/312 |
| 6,607,260 | B1 | 8/2003 | Ikeda | 347/19 |
| 6,657,748 | B1 * | 12/2003 | Okita et al. | 358/461 |
| 7,208,715 | B2 | 4/2007 | Kuan | 250/208.1 |
| 2004/0037581 | A1 * | 2/2004 | Maeda | 399/82 |
| 2006/0157641 | A1 | 7/2006 | Kuan | 250/208.1 |
| 2009/0141307 | A1 * | 6/2009 | Slijp et al. | 358/1.15 |

FOREIGN PATENT DOCUMENTS

| JP | 2002-344696 | 11/2002 |
|---|---|---|
| JP | 2005-184390 | 7/2005 |
| JP | 3750429 | 12/2005 |
| JP | 2006-197531 | 7/2006 |

* cited by examiner

*Primary Examiner* — Houshang Safaipour
(74) *Attorney, Agent, or Firm* — Fitzpatrick, Cella, Harper & Scinto

(57) ABSTRACT

This invention is directed to an image reading apparatus. In the apparatus, reading an original by irradiating it with light of three primary colors, respectively, and by receiving the reflected light is performed as follows. More specifically, an operation mode is designated, and conditions used to perform image reading are set in accordance with the designated mode. Under the set conditions, the image reading is performed according to a method of irradiating an original sequentially with beams of the three primary colors and reading the beams reflected by the original. Alternatively, under the set conditions, image reading is performed according to a method of irradiating an original simultaneously with beams of two primary colors in each of three different combinations of the three primary colors and reading the beams reflected by the original. Instead, image reading is executed twice according to these two methods.

6 Claims, 11 Drawing Sheets

FIG. 8

| OPERATION MODE NUMBER | OPERATION MODE | 1ST | RESOLU-TION | SETTING | 2ND | RESOLU-TION | SETTING |
|---|---|---|---|---|---|---|---|
| 1 | AUTO-PROCESSED COLOR COPY | COMPLEMENTARY COLOR | 150 | TYPE01 | PRIMARY COLOR | 600 | TYPE10 |
| 2 | HIGH-QUALITY COLOR PHOTO | PRIMARY COLOR | 600 | TYPE02 | n/a | | |
| 3 | COLOR PHOTO READING | PRIMARY COLOR | 300 | TYPE03 | n/a | | |
| 4 | COLOR PRINTED PRODUCT READING | COMPLEMENTARY COLOR | 300 | TYPE03 | PRIMARY COLOR | 600 | TYPE10 |
| 5 | AUTO MOIRE SUPPRESSION MODE | COMPLEMENTARY COLOR | 300 | | | | |
| : | | | | | | | |
| 9 | LOW-RESOLUTION MODE (LOWER THAN 300 DPI) | COMPLEMENTARY COLOR | DESIGNATED VALUE | TYPE08 | n/a | | |
| 10 | HALFTONE IMAGE READING | COMPLEMENTARY COLOR | 300 | TYPE09 | n/a | | |
| : | | | | | | | |
| 99 | AUTO COLOR COPY | COMPLEMENTARY COLOR | 150 | TYPE25 | ADAPTIVE | ADAPTIVE | ADAPTIVE |

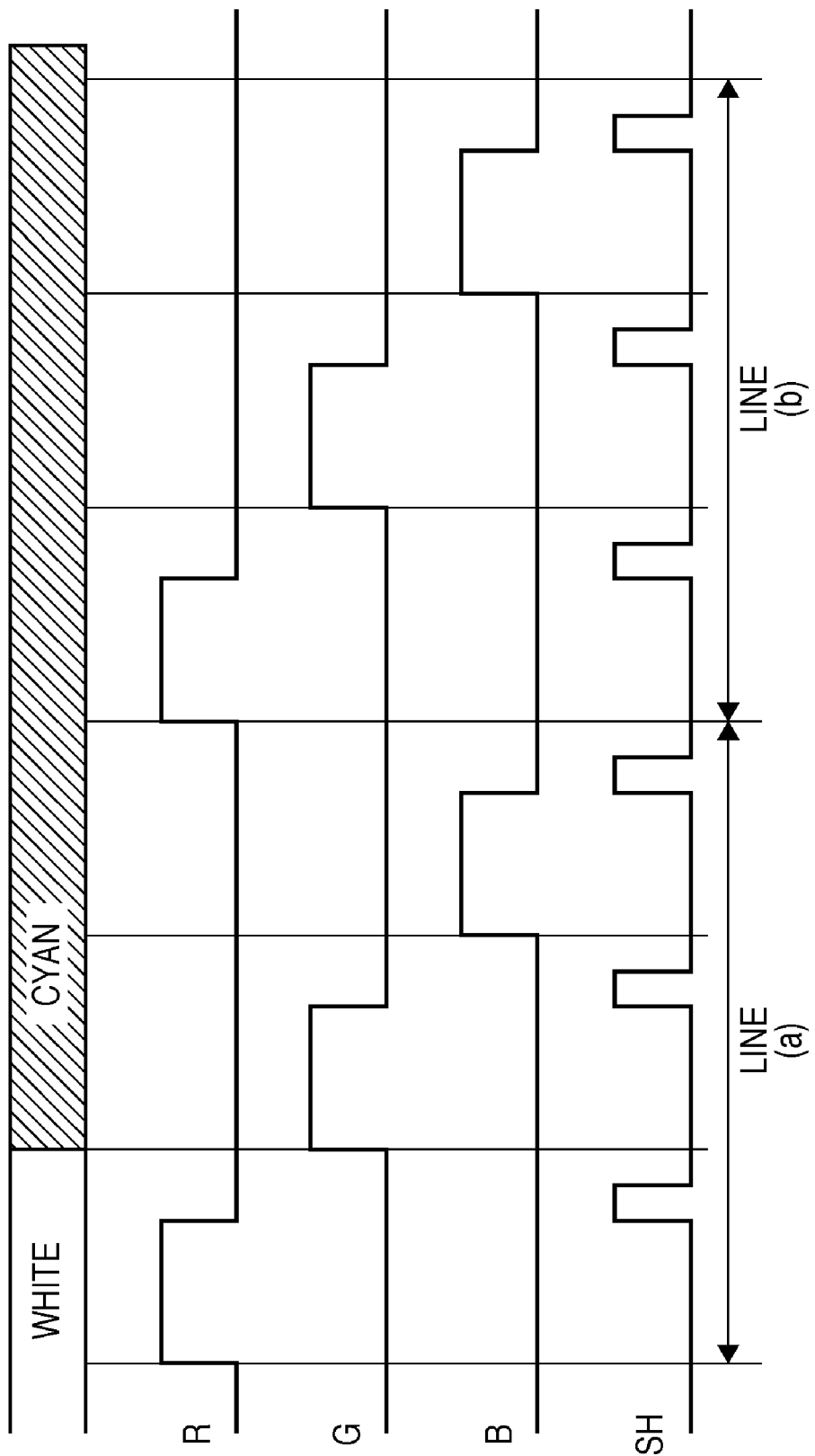

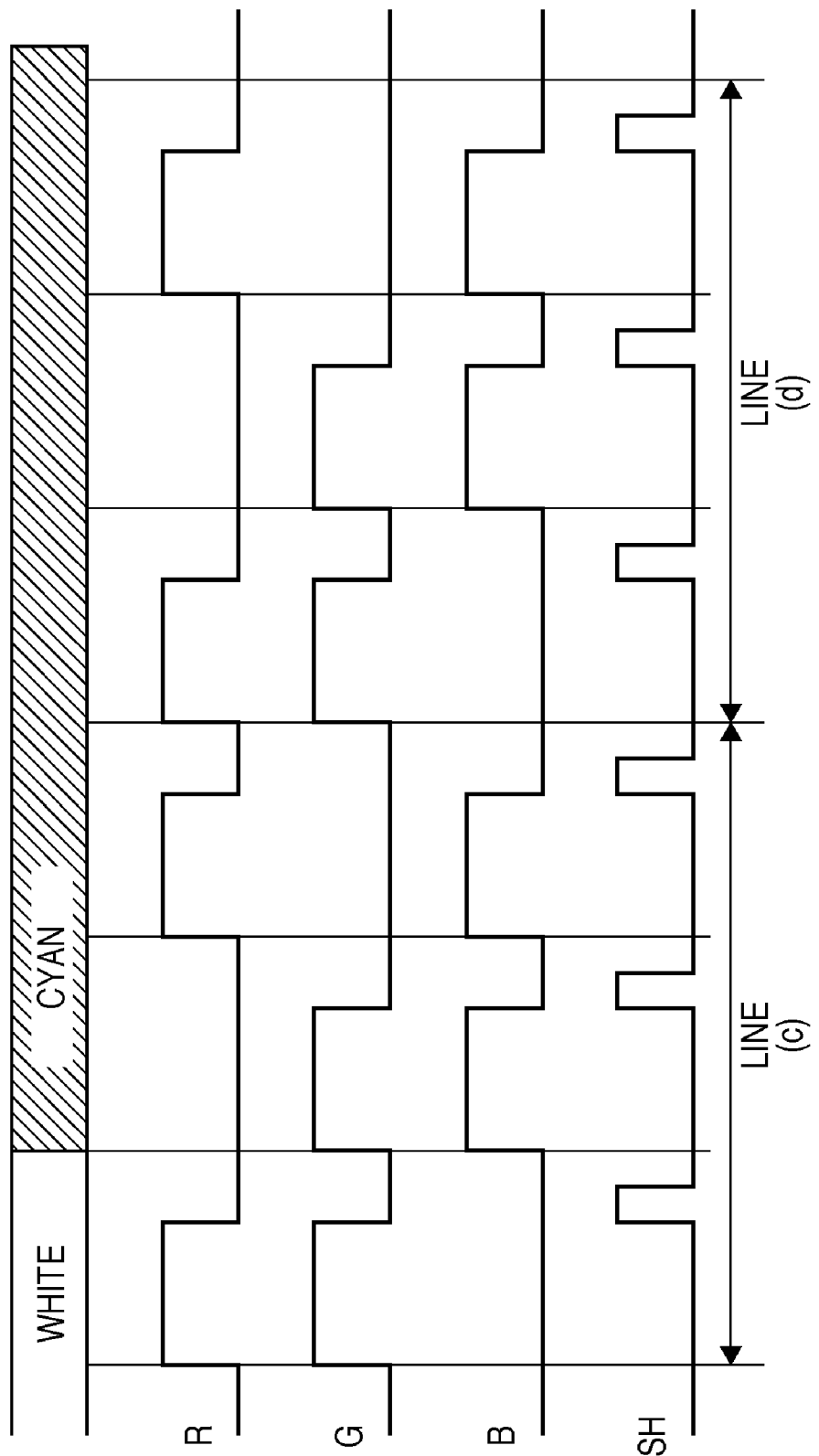

IMAGE READING APPARATUS, MULTIFUNCTION PRINTER APPARATUS, AND IMAGE PROCESSING METHOD

BACKGROUND OF THE INVENTION

1. Field of the Invention

The present invention relates to an image reading apparatus, multifunction printer apparatus, and image reading method. Particularly, the present invention relates to an image reading apparatus, multifunction printer apparatus, and image reading method for optically reading an image original.

2. Description of the Related Art

A color scanner is known as an image reading apparatus which reads an image by switching light of different light emission wavelengths. Such a color scanner has a linear light source and an image sensor provided on a carriage movable in a predetermined direction. The light source includes LEDs capable of irradiating light emission wavelengths corresponding to three primary colors of light, that is, red (R), green (G), and blue (B). The carriage is moved in a direction (sub-scanning direction) perpendicular to the elongated direction (main scanning direction) of the linear light source. The liner image sensor receives reflected light obtained by irradiating an image original with light and reads the image original. To read the image original, a scanning read method is employed.

In the scanning read method, an original is read by switching three LEDs serving as a light source while conveying a CIS (Contact Image Sensor) unit in the sub-scanning direction. More specifically, the R component data of a color image is obtained by lighting a red LED. Next, the G component data is obtained by lighting a green LED. Finally, the B component data is obtained by lighting a blue LED. Image data of one line is obtained in one red, green, and blue LED lighting cycle. Image data of one page of the image original is obtained by repeating the lighting cycle while conveying the CIS unit in the sub-scanning direction.

In scanning read in which the red, green, and blue LEDs are sequentially turned on, color misalignment occurs. As a method of reducing color misalignment, a method of performing reading by turning on two LED light sources between charge readout timings is known, as disclosed in Japanese Patent Laid-Open No. 2005-184390.

If bright LEDs are used to improve the signal-to-noise ratio, the cost increases. To solve this problem, a method of reading an image by simultaneously turning on two LED light sources is known, as disclosed in Japanese Patent Laid-Open No. 2006-197531.

Alternatively, an image forming apparatus described in Japanese Patent No. 3,750,429 is known, which performs a reading operation appropriate for an original by switching transmitted illumination light in accordance with the transparent original type such as a negative original or positive original.

FIG. 9 is a timing chart showing a primary color reading method of reading an image original by lighting only one color LED at a single timing.

As shown in FIG. 9, according to this method, the red (R), green (G), and blue (B) LEDs are sequentially turned on so that the respective color component data are output in synchronism with a pulse signal SH. When the red LED changes from ON to OFF, and the pulse signal SH is turned on, R component data is output. Similarly, when the green LED or blue LED changes from ON to OFF, and the pulse signal SH is turned on, G component data or B component data is output.

Let (R,G,B)=(255,255,255) be the brightness value of a read white original, and (R,G,B)=(0,255,255) be the brightness value of a read cyan original.

When an edge at which an original changes from white to cyan is read at the timing shown in FIG. 9, the output data of a line (a) is (R,G,B)=(255,255,255), and the output data of a line (b) is (R,G,B)=(0,255,255). In the line (a), at the light emission timing of the red LED, the original color is white. Hence, the brightness output value of the R component is 255. At the light emission timings of the green and blue LEDs, the original color is cyan. Hence, the brightness output value of the G component is 255. The brightness output value of the B component is also 255.

FIG. 10 is a timing chart showing a complementary color reading method of reading an image original by simultaneously turning on two color LEDs (simultaneously lighting two primary colors).

When an edge at which an original changes from white to cyan is read by the complementary color reading method at the timing shown in FIG. 9, the brightness output values are as follows. The output data of a line (c) is (RG,GB,BR)=(510, 510,255), and the output data of a line (d) is (RG,GB,BR)=(255,510,255). The read data is converted into the brightness values of the R, G, and B color components by equation (1). In the line (c), (R,G,B)=(128,255,128). In the line (d), (R,G,B)=(0,255,255). In equation (1), if the values of the R, G and B have a range of 0-255, respectively, the values of the GB, BR and RG have a range of 0-510, respectively. When converting from the GB, BR and RG to the R, G and B, if the GB, BR and RG exceed "255", these values are fixed to be 255, respectively.

$$\begin{pmatrix} R \\ G \\ B \end{pmatrix} = \frac{1}{2} \begin{pmatrix} -1 & 1 & 1 \\ 1 & -1 & 1 \\ 1 & 1 & -1 \end{pmatrix} \begin{pmatrix} GB \\ BR \\ RG \end{pmatrix} \quad (1)$$

Using the obtained values of the lines (a) to (d), a CTF (Contrast Transfer Function) is calculated by equation (2). In the primary color reading method, CTF=18%. In the complementary color reading method, CTF=7%.

$$CTF = \frac{W_p - B_p}{W_p + B_p} \cdot 100 \quad (2)$$

Note that, in equation (2), $W_p$ is the maximum brightness, and $B_p$ is the minimum brightness. Further note that conversion into brightness uses the following equation: Brightness=0.3R+0.6G+0.1B.

As understood from a comparison between the calculated CTFs, the CTF value obtained by the complementary color reading method is smaller than that obtained by the primary color reading method. That is, if the complementary reading method is employed, an image having a blurred edge is read. Since the reading method in the sub-scanning direction is different between the primary color reading method and the complementary color reading method, the CTF value readily changes at an edge portion in the sub-scanning direction.

The same as in image original reading by the method of simultaneously lighting two colors also applies to a two-color LED time-divisional lighting method as shown in FIG. 11.

As described above, the reading reproducibility of an edge portion according to a primary color reading method differs from that according to a complementary color reading. In actual image reading, various kinds of images are read. When forming a read image, a given reading method is suited to high edge-reproducibility, and another is appropriate for low edge-reproducibility. However, a conventional apparatus can employ only either method in reading.

SUMMARY OF THE INVENTION

Accordingly, the present invention is conceived as a response to the above-described disadvantages of the conventional art.

For example, an image reading apparatus, multifunction printer apparatus, and image reading method according to this invention are capable of suitably reading an original according to an operation mode taking property of a target image into consideration.

According to one aspect of the present invention, there is provided an image reading method of reading an image original by irradiating the image original with light from a light emitting unit for emitting beams of three primary colors, respectively, and by receiving reflected light of the light by a light receiving unit, comprising: a designation step of designating an image reading operation mode; a setting step of setting a condition used to perform image reading in accordance with the operation mode designated in the designation step; and a reading step of performing, under the condition set in the setting step, at least either of image reading complying with a primary color reading method of irradiating the image original sequentially with beams of the three primary colors by the light emitting unit and reading the beams reflected by the image original by the light receiving unit, and image reading complying with a complementary color reading method of irradiating the image original simultaneously with beams of two primary colors in each of three different combinations of the three primary colors by the light emitting unit and reading the beams reflected by the image original by the light receiving unit.

According to another aspect of the present invention, there is provided an image reading apparatus which reads an image original by irradiating the image original with light from a light emitting unit for emitting beams of three primary colors, respectively, and by receiving reflected light of the light by a light receiving unit, comprising: a designation unit configured to designate an image reading operation mode; a setting unit configured to set a condition used to perform image reading in accordance with the operation mode designated by the designation unit; and a reading unit configured to perform, under the condition set by the setting unit, at least either of image reading complying with a primary color reading method of irradiating the image original sequentially with beams of the three primary colors by the light emitting unit and reading the beams reflected by the image original by the light receiving unit, and image reading complying with a complementary color reading method of irradiating the image original simultaneously with beams of two primary colors in each of three different combinations of the three primary colors by the light emitting unit and reading the beams reflected by the image original by the light receiving unit.

According to still another aspect of the present invention, there is provided a multifunction printer comprising: the above-mentioned image reading apparatus; and a printing unit configured to print an image on a print medium based on image data representing an image read by the image reading apparatus or externally input image data.

The invention is particularly advantageous since reading can be performed using a reading method appropriate for an operation mode based on a target image and satisfactory image reading can be achieved. The invention can implement image reading which exploits the merits of respective reading methods.

Further features of the present invention will become apparent from the following description of exemplary embodiments (with reference to the attached drawings).

BRIEF DESCRIPTION OF THE DRAWINGS

FIG. 8 is a table exemplifying the contents of a reading method table.

FIG. 9 is a timing chart showing a primary color reading method of reading an image original by turning on only one color LED at a single timing.

FIG. 10 is a timing chart showing a complementary color reading method of reading an image original by simultaneously turning on two color LEDs.

DESCRIPTION OF THE EMBODIMENTS

Figure 1A:
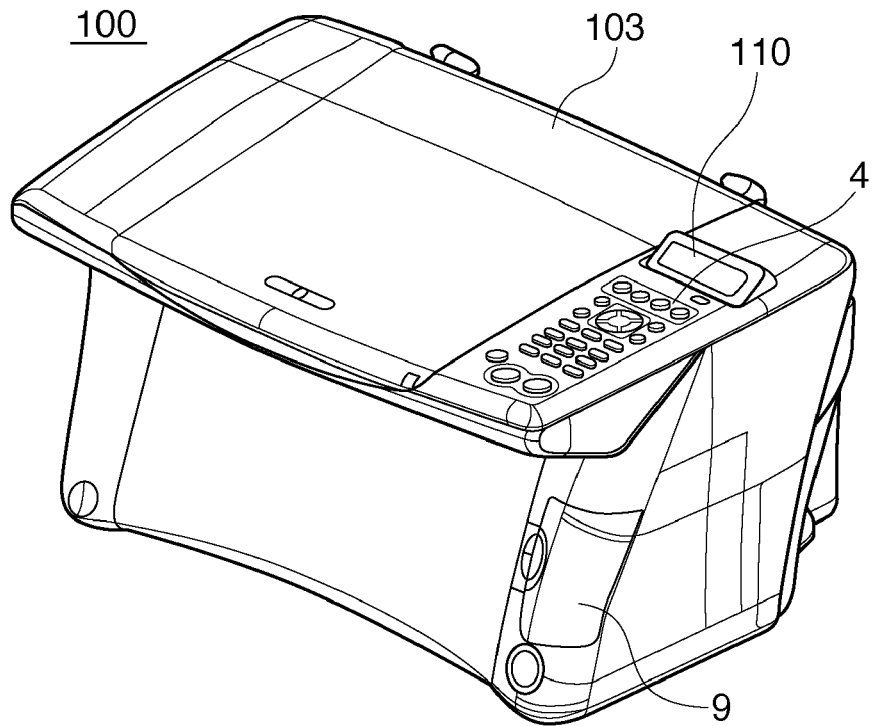
FIGS. 1A and 1B are perspective views showing the schematic arrangement of a multifunction printer (MFP) according to a typical embodiment of the present invention.

Exemplary embodiments of the present invention will now be described in detail in accordance with the accompanying drawings. The same reference numerals denote already described parts, and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

The arrangement of a multifunction printer apparatus (to be referred to as an "MFP apparatus" hereinafter) will be described first.

<MFP Apparatus>

Figure 1B:
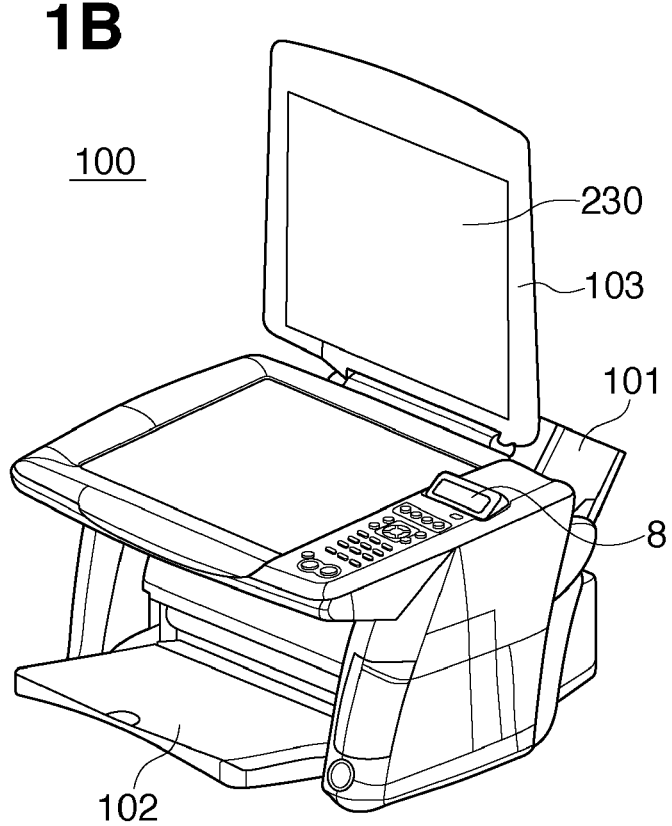

FIGS. 1A and 1B are perspective views showing the schematic arrangement of an MFP apparatus 100 according to a typical embodiment of the present invention.

The MFP apparatus can print an image on a printing medium such as a printing paper sheet based on image data from a connected host (not shown) or image data stored in a memory card, and also read and copy an image original.

FIG. 1A shows a state in which an original cover 103 is closed. FIG. 1B shows a state in which a printing medium tray 101, a discharge tray 102, and the original cover 103 are open.

A reading unit 8 including a CIS (Contact Image Sensor) unit reads an image original and outputs analog brightness signals of R, G, B components. A card interface 9 is used to receive a memory card in which image files taken by, for example, a digital still camera (not shown) are stored and read out image data from the memory card in accordance with a predetermined operation on an operation unit 4. The MFP apparatus 100 also includes a display unit such as an LCD 110. The LCD 110 is used to display contents set by the operation unit 4 or a function selection menu.

Figure 2:
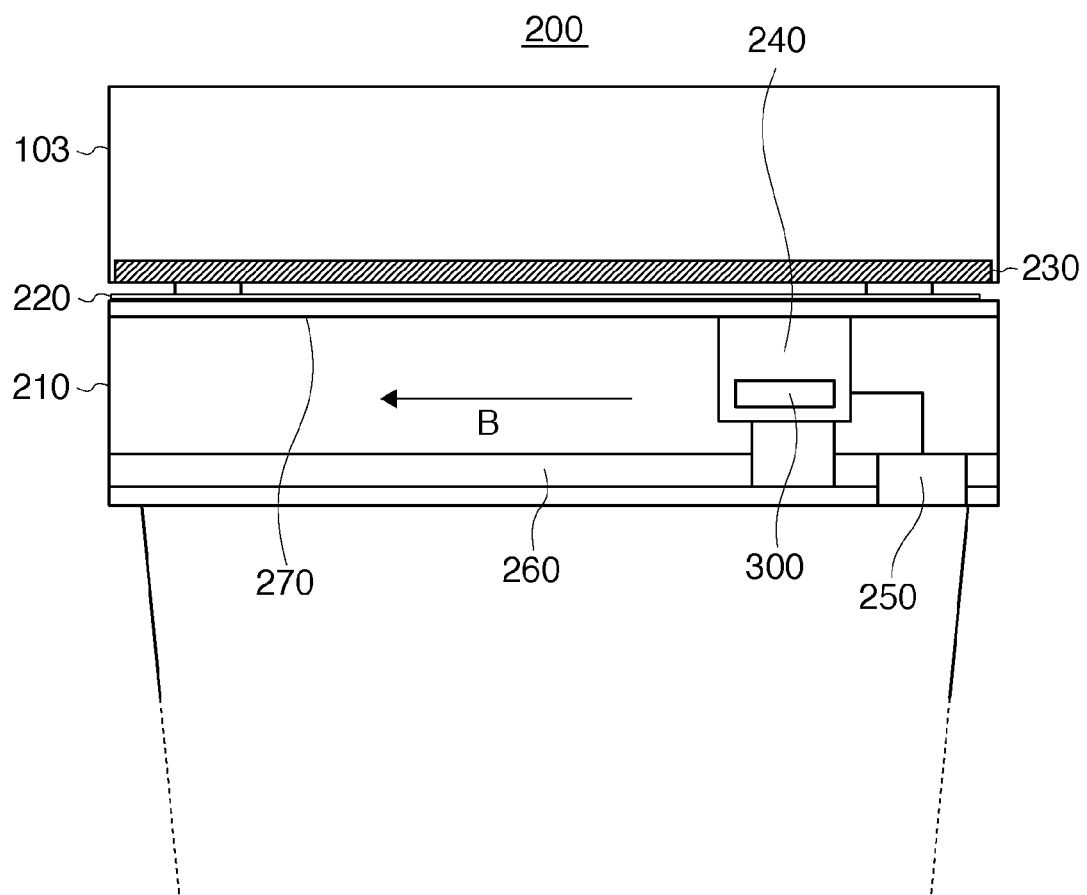
FIG. 2 is a sectional view of an image reading apparatus provided on the upper side of the MFP apparatus shown in FIGS. 1A and 1B.

FIG. 2 is a sectional view of an image reading apparatus provided on the upper side of the MFP apparatus shown in FIGS. 1A and 1B.

As shown in FIG. 2, an image reading apparatus 200 includes a main body 210 and a press plate 230 which presses an original 220 as a reading object and shields external light. The press plate 230 is set on the lower side of the original cover 103. The main body 210 includes an optical unit 240, a circuit board 250 electrically connected to the optical unit 240, a sliding rod 260 serving as a rail to scan the optical unit 240, and an original glass table 270. The optical unit 240 incorporates a CIS unit 300 which irradiates the original 220 with light, receives reflected light, and converts it into an electrical signal. In image reading, the optical unit 240 scans the original 220 placed on the original glass table 270 in the direction (sub-scanning direction) of an arrow B, thereby reading an image printed on the original 220.

Figure 3:
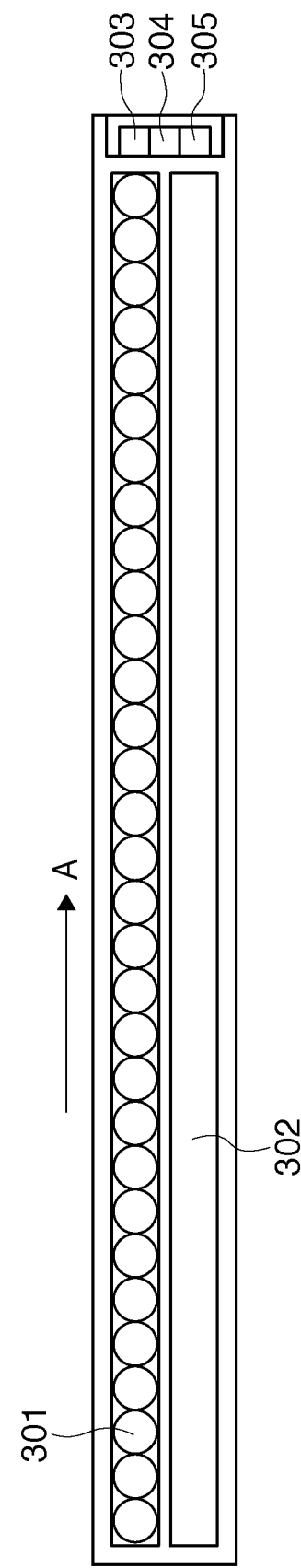
FIG. 3 is a side sectional view showing the detailed structure of a CIS (Contact Image Sensor) unit.

FIG. 3 is a side sectional view showing the detailed structure of the CIS unit 300.

As shown in FIG. 3, the CIS unit 300 includes a red LED 303 which emits red light, a green LED 304 which emits green light, and a blue LED 305 which emits blue light. In original reading, the respective color LEDs are time-divisionally turned on for each line. The original is uniformly irradiated with the emitted light via a light guide 302. A SELFOC® lens 301 condenses the reflected light for each pixel. An image of the light is formed on a photoelectric transducer (not shown) in the CIS unit so that the received light is converted into an electrical signal. An image signal of one line including R, G, and B color component signals is output in this way. The CIS unit 300 is moved in the sub-scanning direction, thereby reading the image all over the original. The direction of an arrow A which represents the cell array direction of the SELFOC® lens 301 is called a main scanning direction. The main scanning direction is perpendicular to the sub-scanning direction. In FIG. 2, the main scanning direction is perpendicular to the drawing surface.

Figure 4:
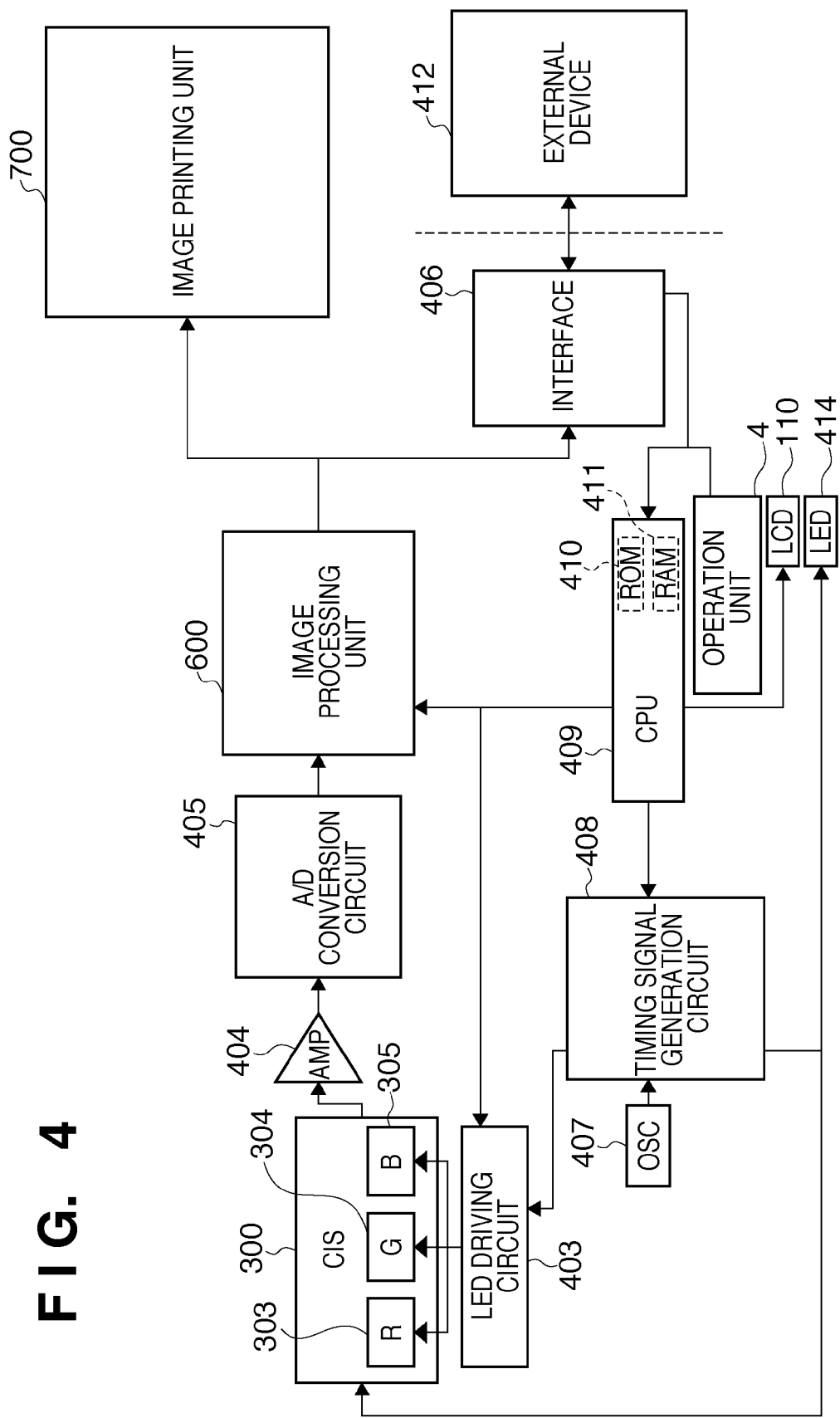
FIG. 4 is a block diagram showing the arrangement of the control circuit of the image reading apparatus.

FIG. 4 is a block diagram showing the arrangement of the control circuit of the image reading apparatus.

The same reference numerals as in FIGS. 1A, 1B, 2 and 3 denote already described constituent elements in FIG. 4, and a description thereof will not be repeated.

The CIS unit 300 line-sequentially reads a color image by causing an LED driving circuit 403 to selectively turn on the color LEDs 303 to 305 for each line. The LEDs 303 to 305 are light sources capable of changing the irradiation light amount on an original. The LED driving circuit 403 can arbitrarily turn on the LEDs 303 to 305.

More specifically, it is possible to sequentially turn on one or two of the LEDs 303 to 305 at a time or turn on all the three LEDs as needed. An amplifier (AMP) 404 amplifies the signal output from the CIS unit 300. An A/D conversion circuit 405 A/D-converts the amplified electrical signal and outputs, for example, 16-bit digital image data for each color component of each pixel. An image processing unit 600 processes the digital image data converted by the A/D conversion circuit 405. An interface control circuit (I/F) 406 reads out image data from the image processing unit 600 and transmits/receives control data to/from an external device 412 or outputs the image data. The image data from the image processing unit 600 can also be output to an image printing unit. The external device 412 is, for example, a personal computer (not shown).

An image printing unit 700 converts the image data from the interface control circuit 406 into binary data representing "print" or "not print" for each pixel and prints an image on a printing medium using printing materials. As the image printing unit 700, for example, an inkjet printer, a laser beam printer using an electrophotographic method, or a sublimation type printer is usable. These printers are known, and a detailed description thereof will be omitted.

The above-described series of processes is roughly classified into two types in accordance with the operation contents.

A copy or image reading (scanning) operation performed by the MFP apparatus alone will be described. In this case, the user of the apparatus inputs necessary instructions via the operation unit 4.

Figure 5:
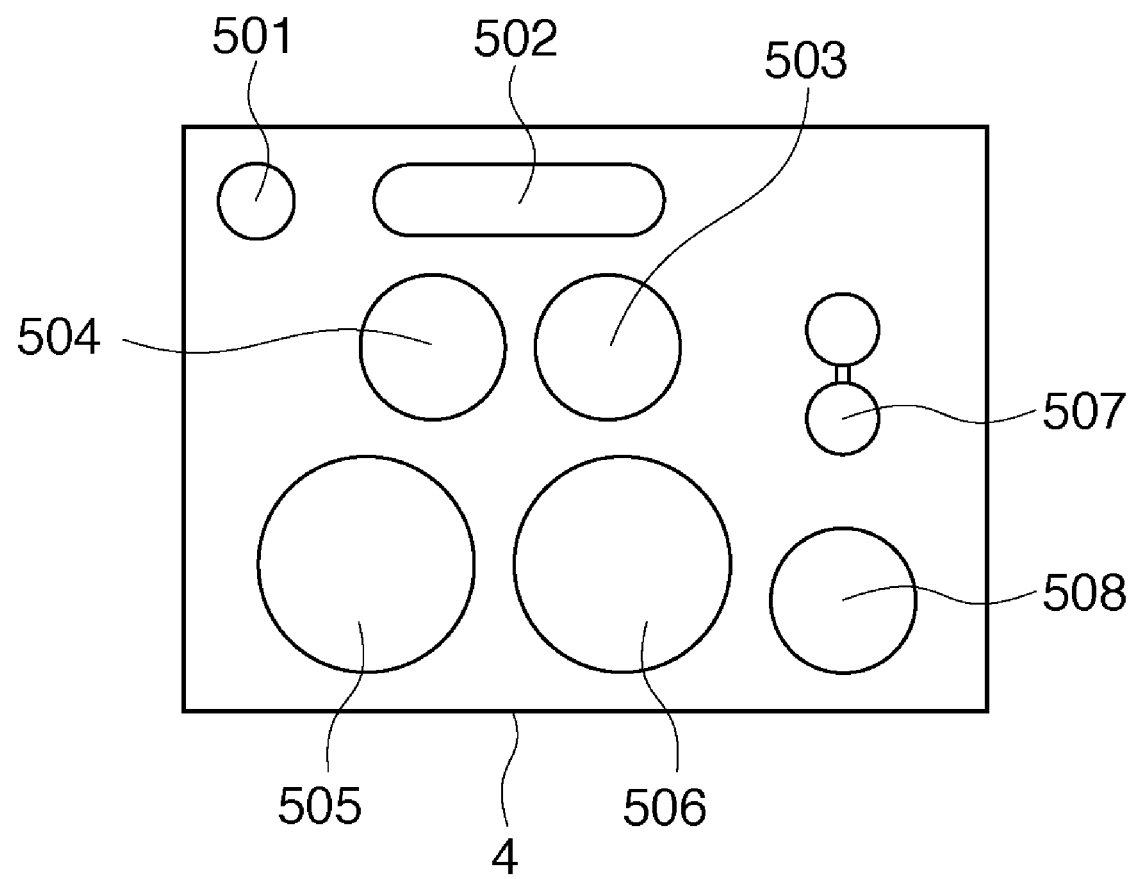
FIG. 5 is a view showing a detailed example of the arrangement of an operation unit.

FIG. 5 is a view showing a detailed example of the arrangement of the operation unit 4. The arrangement of the operation unit 4 will be described here with reference to FIG. 5.

The output signal from the operation unit 4 is connected to the input port of a CPU 409. A button 501 is a power key. A button 502 is a function selection button. Operable function contents are displayed on the LCD 110 in correspondence with the number of times the button 502 is pressed. Operations are set in accordance with the displayed function contents. When the user presses a determination button 503, the contents are set in a RAM 411. A button 504 is a cancel button. When the user presses a button 505, a color copy operation starts in accordance with the settings in the RAM 411. When the user presses a button 506, a monochrome copy operation starts in accordance with the settings in the RAM 411. The user presses a button 507 to designate the number of sheets or density. A button 508 is a reset button. The user can press the button 508 to cancel scanning or printing.

The description will be continued with reference to FIG. 4.

The above-described operation instruction from the operation unit 4 is controlled by the CPU 409 in the form of a microcomputer. The CPU 409 reads out a processing program ("control program 670" in FIG. 6 to be described later) stored in a ROM 410 and executes the control using the RAM 411 as a work area. Referring to FIG. 4, reference numeral 407 denotes a reference signal oscillator (OSC) such as a quartz oscillator, and reference numeral 408 denotes a timing signal generation circuit which divides the output of the reference signal oscillator 407 in accordance with the settings of the CPU 409 to generate various kinds of timing signals as the base of operations.

For an operation based on an instruction from a personal computer (external device 412), a copy or image reading (scanning) instruction is issued from the personal computer to the CPU 409. The operation from then on is the same as in the copy or image reading (scanning) operation performed by the MFP apparatus alone.

An LED 414 serves as the backlight source of the LCD 110 and is ON/OFF-controlled by a lighting signal output from the timing signal generation circuit 408.

Details of the image processing unit 600 will be described next.

Figure 6:
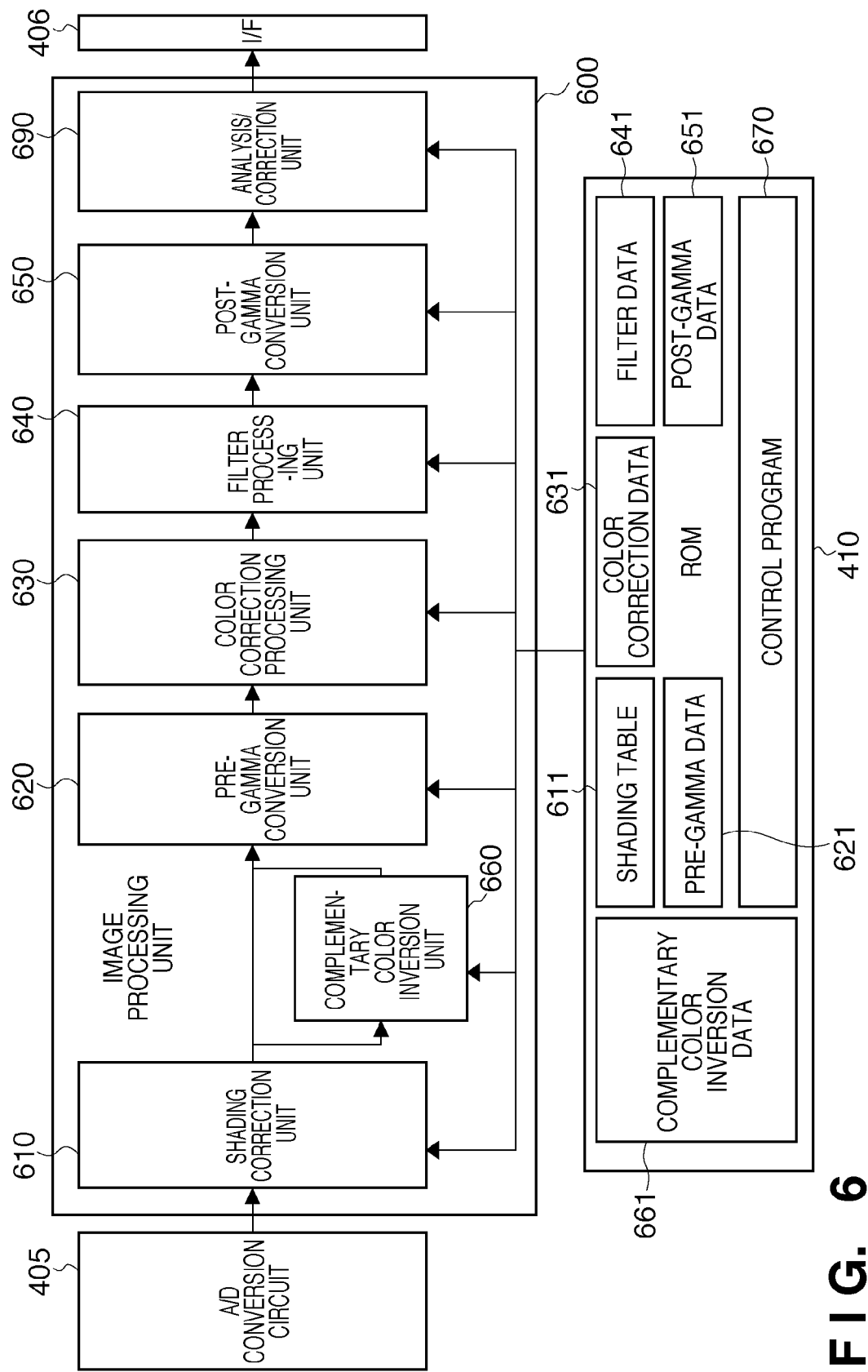
FIG. 6 is a block diagram showing the detailed arrangement of an image processing unit.

FIG. 6 is a block diagram showing the detailed arrangement of the image processing unit 600.

Digital image data converted by the A/D conversion circuit 405 is input to a shading correction unit 610. The shading correction unit 610 obtains shading correction data by reading a reference white board (not shown) bonded to the lower surface of an index plate (not shown) bonded to the original glass table 270 of the image reading apparatus 200.

A table used for the shading correction is shading table 611 stored in the ROM 410. The digital image data which has undergone the shading correction is input to a pre-gamma conversion unit 620. The pre-gamma conversion unit 620 performs gamma correction to obtain a visually preferable brightness distribution. Data used in the pre-gamma conversion unit 620 is pre-gamma data 621 stored in the ROM 410. The digital image data which has undergone the pre-gamma conversion is input to a color correction processing unit 630. The color correction processing unit 630 performs conversion processing to obtain preferable colors. Data used in the color correction processing unit 630 is color correction data 631 stored in the ROM 410.

The digital image data output from the color correction processing unit 630 is input to a filter processing unit 640. The filter processing unit 640 performs filter processing such as edge enhancement or noise reduction of the digital image data. Data used for the filter processing is filter data 641 stored in the ROM 410. The digital image data output from the filter processing unit 640 is input to a post-gamma conversion unit 650. The post-gamma conversion unit 650 fine-tunes the brightness characteristic of the received digital image data again in accordance with the application purpose. Data used in the post-gamma conversion unit 650 is post-gamma data 651 stored in the ROM 410.

The post gamma conversion unit 650 outputs the digital image data to an analysis/correction unit 690. The analysis/correction unit 690 performs an analysis for detecting the end of an original in order to extract original contents from a read image, an analysis complying with the type of original (e.g., a halftone image, silver halide photograph, document, or handwritten manuscript), and correction and processes based on the analysis results. The analysis/correction unit 690 outputs the corrected/processed image to the interface control circuit 406. These data are set in each processing unit from the ROM 410 by reading out and executing the contents of the control program 670 by the CPU 409.

A complementary color inversion unit 660 is an image processing unit which is used only when an instruction for complementary color reading is given. This processing is also controlled by the control program 670 stored in the ROM 410. Complementary color inversion data 661 stored in the ROM 410 is used for the processing. The control program also controls the operation of the LED driving circuit 403.

Several embodiments of image reading executed in the MFP apparatus having the above-described arrangement will be described in detail.

First Embodiment

Processing of switching a reading method to read an image when reading an image original a plurality of number of times will be explained.

Figure 7:
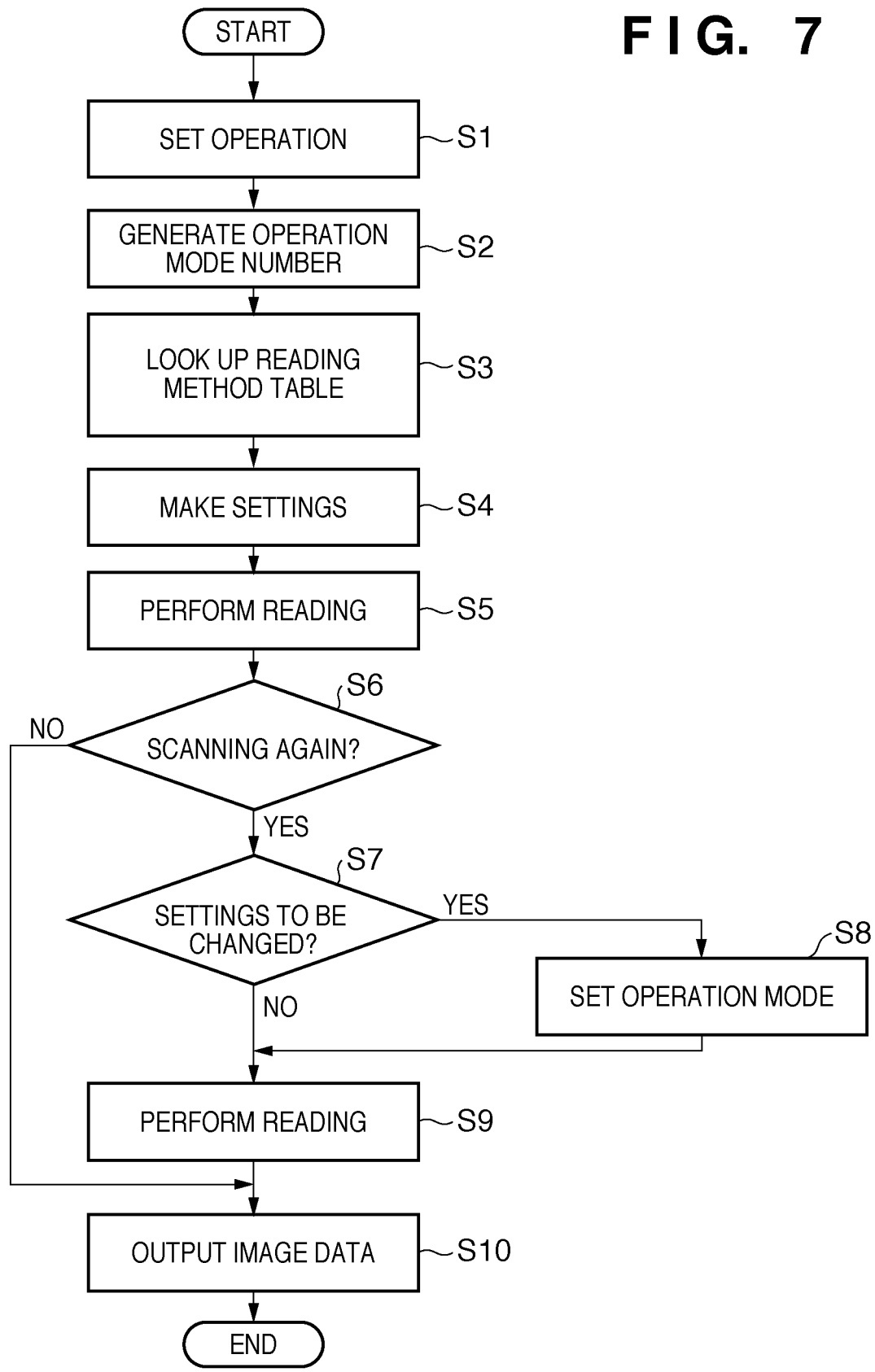
FIG. 7 is a flowchart showing image original reading processing.
Figure 11:
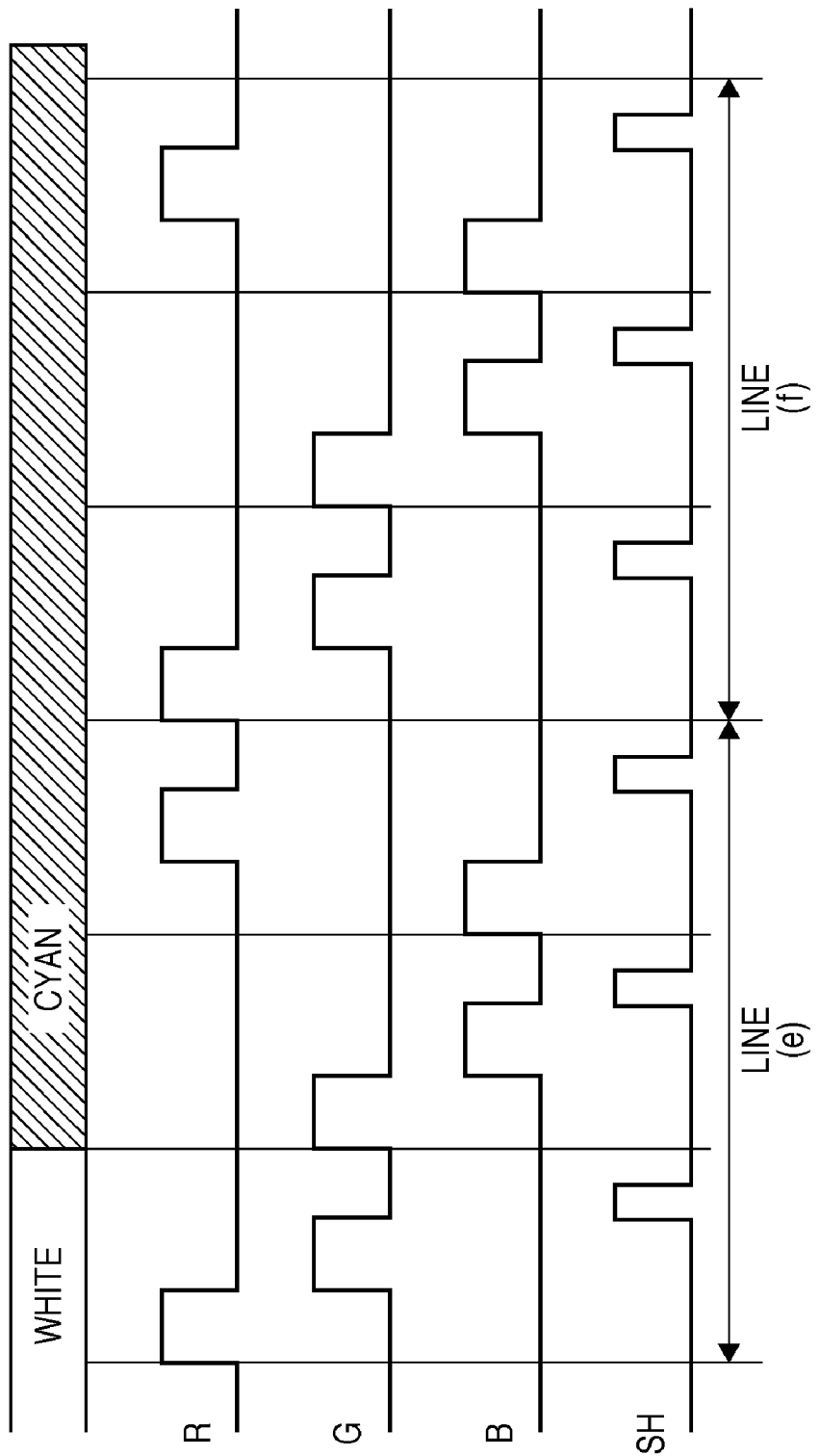
FIG. 11 is a timing chart showing a method of reading an image original using a two-color LED time-divisional lighting method.

FIG. 7 is a flowchart showing image original reading processing.

In step S1, a user sets the operation of an MFP apparatus, for example, "auto-processed color" copy via the operation unit 4. In step S2, an operation mode number is generated based on the designated operation. In step S3, a reading method table stored in a ROM 410 is looked up using the operation mode number.

The reading method table stores information of detailed settings necessary for reading operation, using the operation mode number as a key index.

FIG. 8 is a table exemplifying the contents of the reading method table.

As shown in FIG. 8, this table uses the "operation mode number" as an index, and holds information on the scan count and reading method (primary color reading method and complementary color reading method). The table may additionally hold information on the reading resolution, accumulation time, and motor speed. In FIG. 8, "primary color" represents the primary color reading method, and "complementary color" represents the complementary color reading method.

In FIG. 8, an operation mode number "1" represents an operation mode for automatically creating image processing conditions. This operation mode executes a first reading to create correction process conditions, and a second reading to correct a read image using the correction process information determined in the first reading.

An operation mode number "2" represents an operation mode in which reading is performed only once and the reading method is the primary color reading method. An operation mode number "99" represents an operation mode for automatically setting a reading method and creating image processing conditions. This mode executes the first reading to determine a reading method and create correction process conditions, and the second reading to correct a read image using the determined reading method and created correction process information in the first reading.

Note that the "auto-processed color copy" mode mentioned above corresponds to the operation mode number "1". In this case, reading is executed twice.

In step S4, detailed reading conditions are set in the CPU 409, based on the obtained reading method. In step S5, complementary color reading is performed according to the settings made in step S4 in the currently examined "auto-processed color copy" mode in which light sources are turned on by combinations of R and G, G and B, and B and R. In this case, the CTF upon reading becomes low, and moire and a false color generated upon reading can be reduced. This increases the precision at which an original is microscopically analyzed to calculate the degree of process and correction.

This analysis includes an analysis for determining the attribute of the target pixel of an original, i.e., whether the pixel corresponds to an undercolor, text portion, halftone portion, or halftone natural image. Color information of the original is also analyzed, and the analysis result is used in color balance correction and saturation correction. The result of edge analysis is used to obtain the reading characteristic of the original and determine a reading method and image processing contents.

Some or all of the analysis results are used to determine the type of original such as a printed product, photo, or newspaper.

In step S6, it is determined whether or not to read the original again. This determination is based on information attained by looking up the reading method table. If it is determined that the original needs to be read again, the process advances to step S7. On the other hand, if it is determined that the original need not be read again, the process advances to step S10. Note that the currently examined "auto-processed color copy" mode requires re-reading, so the process advances to step S7.

In step S7, it is determined whether or not the settings of detailed reading conditions in re-reading need to be changed (set again). If it is determined that the settings need to be changed, the process advances to step S8. The detailed reading conditions which comply with a reading method in re-reading and reflect the analysis results obtained in the first image reading are set again in the CPU 409. In the currently examined "auto-processed color copy" mode, re-reading is performed according to the primary color reading method having a high CTF, and the settings of detailed reading conditions need to be changed. Hence, the process advances to step S8 to change the settings. To the contrary, if it is determined that no setting need be changed, the process advances to step S9.

In step S9, re-reading is executed under the set detailed conditions. In the currently examined "auto-processed color copy" mode, reading is performed in accordance with the primary color reading method. Thus, the CTF upon reading becomes high, increasing the perceived resolution and improving the macroscopic appearance of the original.

Finally in step S10, an image processing unit 600 outputs image data obtained by reading the original. In the currently examined "auto-processed color copy" mode, the image processing unit 600 outputs the image data to the image printing unit 700.

According to the first embodiment, in the "auto-processed color copy" mode, image data obtained by the first image reading is microscopically analyzed, and the second image reading is performed based on the analysis result. As a result, an image can be read at high quality.

Second Embodiment

The second embodiment will describe an example of reading a "halftone image". Only characteristic processing of the second embodiment will be explained, and a description of the same processing as that in the first embodiment will not be repeated. The processing in the second embodiment also refers to the flowchart of FIG. 7 and the reading method table of FIG. 8.

In step S1, the user designates a "halftone image reading" mode as the operation mode of an MFP apparatus via an operation unit 4. In step S2, an operation mode number is generated based on the designated operation. In step S3, the reading method table stored in a ROM 410 is looked up using the operation mode number. In this example, the operation mode number is "10".

As shown in FIG. 8, the operation mode number "10" represents a mode for reading a halftone image. In this mode, an original is read once by the complementary color reading method.

In step S4, detailed reading conditions are set in a CPU 409 based on the obtained reading method. In step S5, complementary color reading is performed according to the settings made in step S4 in the currently considered "halftone image reading" mode in which light sources are turned on by combinations of R and G, G and B, and B and R. In this case, the CTF upon reading becomes low, and moire and a false color generated upon reading can be reduced.

In step S6, it is determined whether or not re-reading is necessary. Since the original is read once in the currently considered "halftone image reading" mode, it is determined that no re-reading is necessary, and the process advances to step S10. Image data obtained by reading the original is output from an image processing unit 600 to an image printing unit 700.

According to the second embodiment, a halftone image is read once by the complementary color reading method in the "halftone image reading" mode. Image data which has a low CTF and reduces moire and a false color can be attained.

The primary color reading method and complementary color reading method may be switched based on the reading resolution. For example, it is possible to use the primary color reading method at a satisfactorily high resolution (e.g., 600 dpi or higher), the complementary color reading method at a resolution of 150 dpi or a range of higher than 150 dpi and lower than 600 dpi, and the primary color reading method at a resolution of lower than 150 dpi. In this manner, complementary color reading may be performed only at a specific reading resolution. If the threshold for switching the reading method is changed depending on the halftone periodicity of an original, image reading which reduces moire and improves the perceived resolution can be implemented.

Third Embodiment

The third embodiment will describe an example of reading a "photo". Only characteristic processing of the third embodiment will be explained, and a description of the same processing as those in the first and second embodiments will not be repeated. The processing in the third embodiment also refers to the flowchart of FIG. 7 and the reading method table of FIG. 8.

In step S1, the user sets a "photo image reading" mode as the operation mode of an MFP apparatus via an operation unit 4. In step S2, an operation mode number is generated based on the designated operation. In step S3, the reading method table stored in a ROM 410 is looked up using the operation mode number. In this example, the operation mode number is "3".

As shown in FIG. 8, the operation mode number "3" represents a mode for reading a photo at high resolution. In this mode, an original is read once by the primary color reading method.

In step S4, detailed reading conditions are set in a CPU 409 based on the obtained reading method. In step S5, primary color reading is performed according to the settings made in step S4 in the currently considered "photo image reading" mode in which light sources are turned on by a combination of R, G, and B. By doing this, the CTF upon reading becomes high, and an image can be read at high perceived resolution.

In step S6, it is determined whether or not re-reading is necessary. Since the original is read once in the currently considered "photo image reading" mode, it is determined that no re-reading is necessary, and the process advances to step S10. Image data obtained by reading the original is output from an image processing unit 600 to an image printing unit 700.

According to the third embodiment, image reading is performed once by the primary color reading method in the "photo image reading" mode. Photo image data which has a high CTF and high perceived resolution can be obtained.

As the ROM 410 mentioned in the first to third embodiments, an EEPROM is used to rewrite data. Different kinds of memories may be used separately so that data which need not be written is stored in a non-rewriteable ROM and data which needs to be rewritten is stored in an EEPROM. A rewritable nonvolatile memory such as an EPROM or FeRAM is also available in addition to the EEPROM.

In the first to third embodiments, an image is read using light reflected by an original. However, the present invention is not limited to this example, and image reading using transmitted light may be performed.

Further in the first to third embodiments, the CIS emits three, R, G, and B beams, but a light source having a spectrum characteristic different from R, G, and B may be added. In this case, the spectral pattern suffices to use a combination of all or some of the light sources.

In the above-described embodiments, it is possible to increase the printing density and resolution particularly using, of inkjet printing methods, a method of changing the ink state by heat energy generated by a means (e.g., electro-thermal transducer) for generating heat energy for ink discharge.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-326585, filed Dec. 22, 2008, which is hereby incorporated by reference herein in its entirety.

What is claimed is:

1. An image reading method of reading an image original by irradiating the image original with light from a light emitting unit for emitting beams of three primary colors, respectively, and by receiving reflected light of the light by a light receiving unit, comprising:
   a designation step of designating an image reading operation mode;
   a setting step of setting a condition used to perform image reading in accordance with the operation mode designated in the designation step;
   a reading step of performing, under the condition set in the setting step, at least either of image reading complying with a primary color reading method of irradiating the image original sequentially with beams of the three primary colors by the light emitting unit and reading the beams reflected by the image original by the light receiving unit, and image reading complying with a complementary color reading method of irradiating the image original simultaneously with beams of two primary colors in each of three different combinations of the three primary colors by the light emitting unit and reading the beams reflected by the image original by the light receiving unit; and
   a switching step of, in a case where the image reading for the image original is performed twice in the reading step, switching over from one of the primary color reading method and the complementary color reading method used in first image reading to the other of the primary color reading method and the complementary color reading method used in second image reading.

2. The method according to claim 1, further comprising a resetting step of resetting such that a condition used to perform the second image reading for the image original differs from that used to perform the first image reading for the image original.

3. The method according to claim 2, further comprising:
   an analysis step of analyzing image data obtained by the first image reading for the image original; and
   a reflection step of reflecting an analysis result obtained in the analysis step to the resetting in the resetting step.

4. The method according to claim 1, wherein the image reading operation mode includes an auto-processed color copy mode serving as a mode for automatically creating an image processing condition, a halftone image reading mode for reading a halftone image, and a photo image reading mode for reading a photo at high resolution.

5. An image reading apparatus which reads an image original by irradiating the image original with light from a light emitting unit for emitting beams of three primary colors, respectively, and by receiving reflected light of the light by a light receiving unit, comprising:
   a designation unit configured to designate an image reading operation mode;
   a setting unit configured to set a condition used to perform image reading in accordance with the operation mode designated by said designation unit;
   a reading unit configured to perform, under the condition set by said setting unit, at least either of image reading complying with a primary color reading method of irradiating the image original sequentially with beams of the three primary colors by the light emitting unit and reading the beams reflected by the image original by the light receiving unit, and image reading complying with a complementary color reading method of irradiating the image original simultaneously with beams of two primary colors in each of three different combinations of the three primary colors by the light emitting unit and reading the beams reflected by the image original by the light receiving unit; and
   a control unit configured to control said reading unit so as to, in a case where the image reading for the image original is performed twice by said reading unit, switch over from one of the primary color reading method and the complementary color reading method used in first image reading to the other of the primary color reading method and the complementary color reading method used in second image reading.

6. A multifunction printer comprising:
   an image reading apparatus according to claim 5; and
   a printing unit configured to print an image on a print medium based on image data representing an image read by said image reading apparatus or externally input image data.

* * * * *